United States Patent [19]

Koblesky

[11] 3,961,857
[45] June 8, 1976

[54] BORING BAR OR THE LIKE
[75] Inventor: Robert T. Koblesky, Rockford, Ill.
[73] Assignee: The Ingersoll Milling Machine Company, Rockford, Ill.
[22] Filed: Jan. 27, 1975
[21] Appl. No.: 544,318

[52] U.S. Cl. .................................. 408/83; 82/1 A; 279/6; 408/150
[51] Int. Cl.² .................................. B23B 29/034
[58] Field of Search .......... 408/150, 151, 159, 187, 408/188, 81, 82, 83, 197, 198; 279/6; 82/1 A; 90/11 D, 15 B

[56] References Cited
UNITED STATES PATENTS

| | | | |
|---|---|---|---|
| 2,195,026 | 3/1940 | Eden | 408/82 X |
| 2,693,965 | 11/1954 | Briney, Jr. | 279/6 |
| 3,038,386 | 6/1962 | Parske et al. | 90/11 D |
| 3,700,345 | 10/1972 | Schubert | 408/150 |

Primary Examiner—Othell M. Simpson
Assistant Examiner—Z. R. Bilinsky
Attorney, Agent, or Firm—Wolfe, Hubbard, Leydig, Voit & Osann, Ltd.

[57] ABSTRACT

A cutting tooth is carried on the outer end portion of a shaft which is eccentrically mounted within a power-rotated boring bar and which may be selectively turned within the bar to enable the tooth to be adjusted between an inactive retracted position and an active cutting position. By sliding the shaft in one direction, serrated rings mounted on the outer end portion of the shaft and within the outer end portion of the bar may be uncoupled to permit turning of the shaft. When the shaft is slid in the opposite direction, the rings are recoupled to establish a torsionally stiff rotational drive to the tooth by way of the outer end portions of the bar and the shaft. Turning of the shaft to adjust the tooth to its cutting position also effects outward adjustment of support pads for maintaining the outer end portion of the bar in a stable radial position during the boring operation.

2 Claims, 4 Drawing Figures

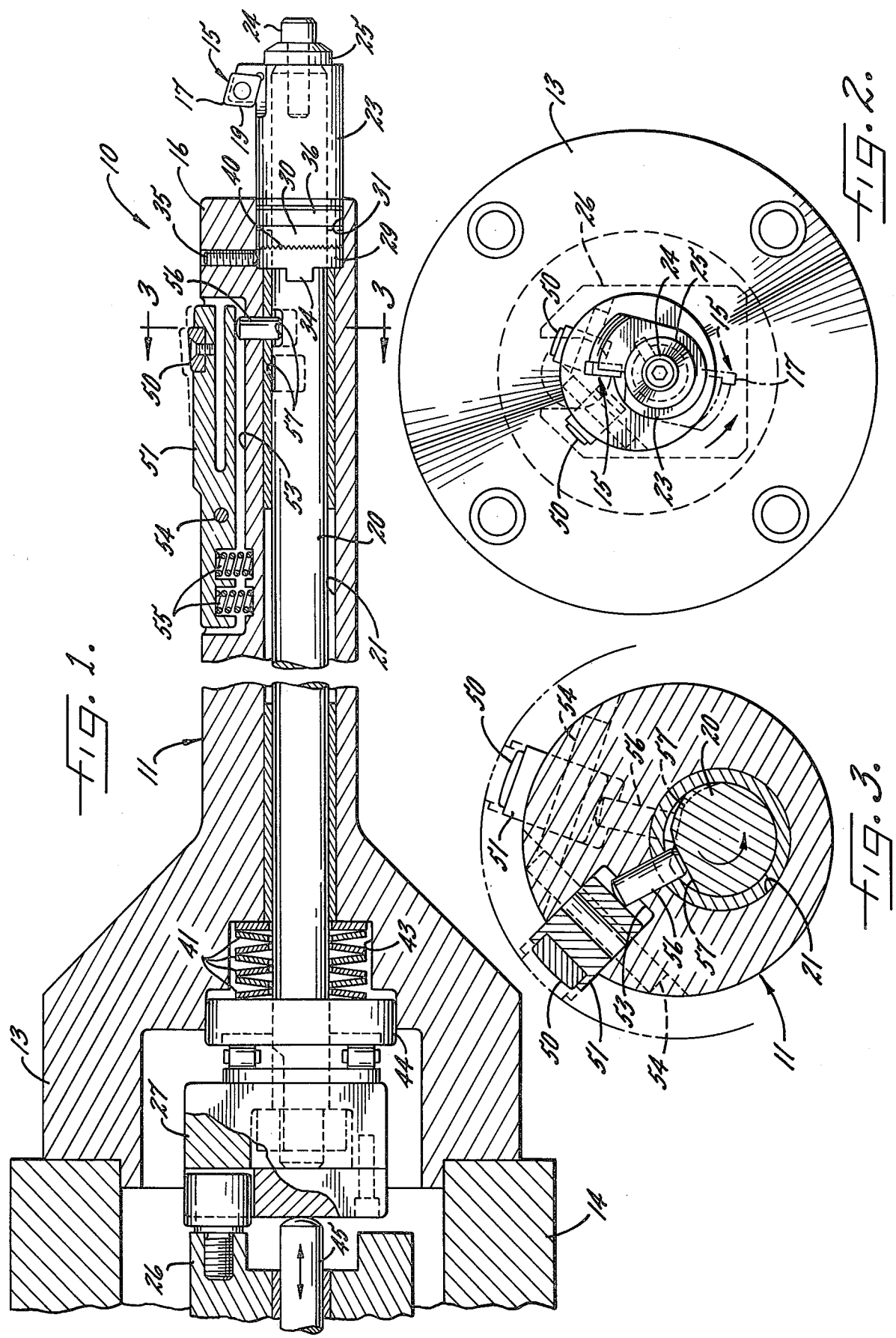

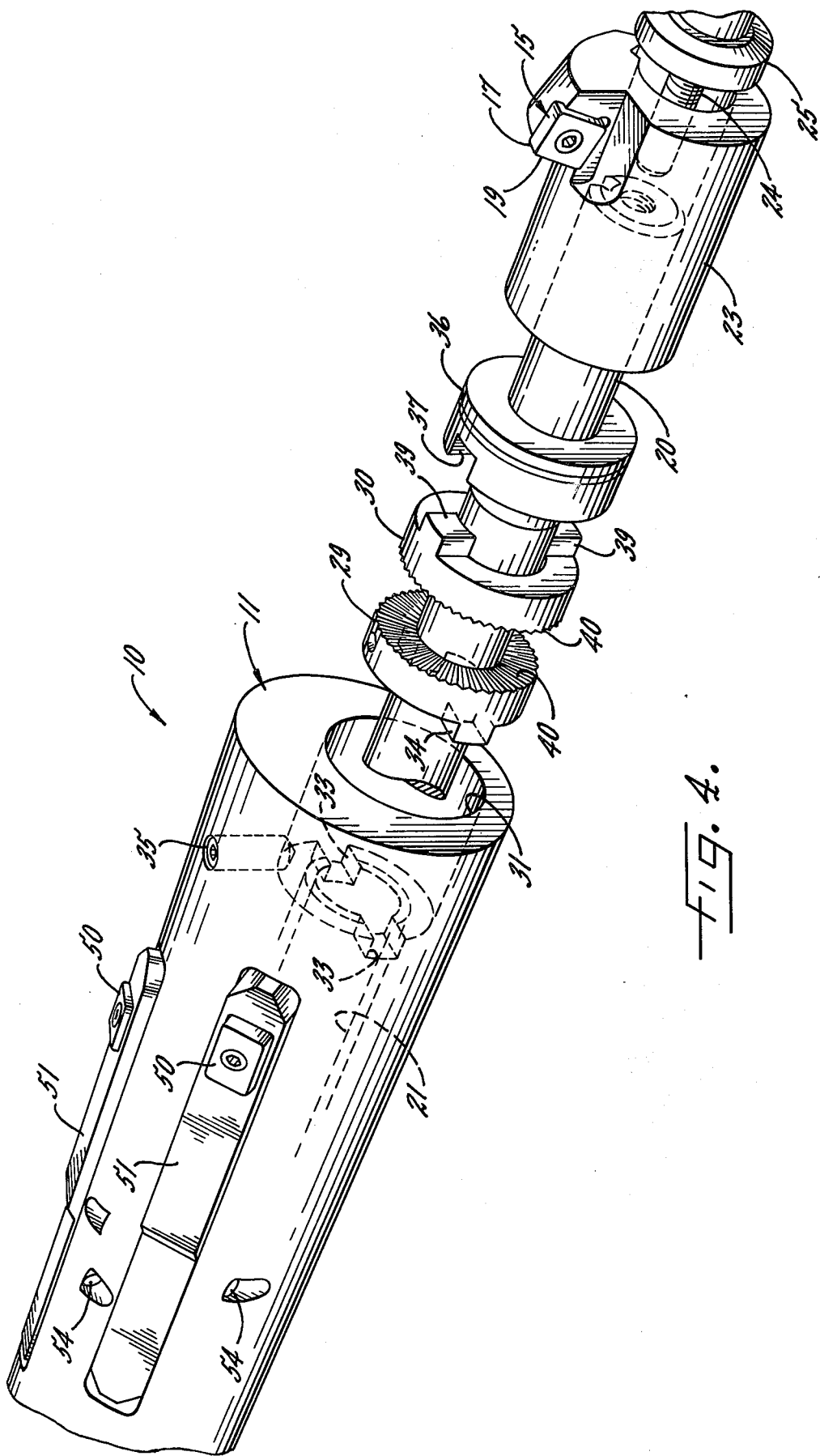

BORING BAR OR THE LIKE

BACKGROUND OF THE INVENTION

This invention relates generally to cutting apparatus and, more particularly, to boring apparatus of the type in which a cutting tooth is secured to a selectively rotatable shaft which is telescoped eccentrically into a power-rotated boring bar. By turning the eccentric shaft through a partial revolution within the bar, the cutting tooth may be adjusted from an inactive retracted position to an active cutting position, the tooth projecting outwardly beyond the periphery of the bar when moved to its cutting position. Boring apparatus of this type frequently is used to perform a back boring operation wherein the bar is thrust through a previously drilled bore while the cutting tooth is retracted and then is backed reversely out of the bore while the tooth is in its outwardly projected cutting position so as to remove material from the wall of the bore.

SUMMARY OF THE INVENTION

The general aim of the present invention is to provide a new and improved cutting apparatus of the foregoing type in which the rotational drive to the cutting tooth is primarily effected by way of the comparatively large diameter and torsionally stiff main bar itself rather than through the relatively slender and torsionally deflectable adjusting shaft to which the tooth is secured. As a result, a torsionally rigid drive to the tooth is maintained even though the tooth is carried on the adjusting shaft and is capable of being selectively rotated relative to the bar.

A more detailed object is to provide unique boring apparatus in which the tooth-carrying shaft may be rigidly coupled to the outer end portion of the main bar to provide a torsionally stiff rotational drive to the cutting tooth, the shaft being capable of being selectively uncoupled from the bar to permit turning of the shaft and adjustment of the cutting tooth.

The invention also resides in the novel provision of comparatively simple clutch rings on the shaft and within the bar, the rings coacting with one another to enable the shaft to be coupled to and uncoupled from the bar.

Still another object is to equip the bar with unique support pads which stabilize the bar within the bore and which are adapted to be moved into active positions as an incident to adjusting the shaft to move the cutting tooth to its cutting position.

These and other objects and advantages of the invention will become more apparent from the following detailed description when taken in conjunction with the accompanying drawings.

BRIEF DESCRIPTION OF THE DRAWINGS

FIG. 1 is a fragmentary cross-section taken substantially longitudinally through new and improved boring apparatus incorporating the unique features of the present invention.

FIG. 2 is an end view of the apparatus as seen from the right of FIG. 1.

FIG. 3 is an enlarged cross-section taken substantially along the line 3—3 of FIG. 1.

FIG. 4 is an exploded perspective view of parts of the apparatus.

DETAILED DESCRIPTION OF THE PREFERRED EMBODIMENT

As shown in the drawings for purposes of illustration, the invention is embodied in boring apparatus 10 comprising an elongated and comparatively large diameter boring bar 11 adapted to be connected at its inner end portion 13 to the power-rotated spindle 14 of a conventional boring machine. An indexable cutting insert or tooth 15 is located outwardly beyond the outer end portion 16 of the bar and is adapted to remove metal or other material from the wall of a previously drilled bore, the action of the tooth serving to enlarge the bore to its final diameter and to improve the surface finish of the wall of the bore.

The present boring bar 11 is particularly suitable for use in back boring a bore whose unfinished diameter is somewhat larger than the diameter of the bar. In a back boring operation, the bar is thrust forwardly through the bore while the tooth 15 is located in an inactive position (as shown in full lines in FIG. 2) in which the entire tooth is disposed radially inwardly of the periphery of the bar so as to enable the tooth to pass through the bore. After the tooth has passed forwardly through the end of the bore, it is adjusted radially outwardly to an active cutting position (as shown in phantom in FIG. 2) in which the edge 17 of the tooth projects radially outwardly from the periphery of the bar. The bar then is rotated about its own axis and is simultaneously pulled reversely out of the bore so that the cutting edge 19 of the tooth removes metal from the bore wall and finishes the bore to a diameter corresponding to twice the radial spacing of the edge 19 from the central axis of the bar.

To support the tooth 15 for adjustment between its inactive retracted position and its outwardly projected cutting position, the tooth is carried on the outer end portion of an elongated shaft 20 which extends through and is journaled in an axially extending hole 21 formed through the bar 11. The outer end of the shaft projects outwardly from the outer end of the bar and is telescoped into and keyed within a collar 23 upon which the tooth is mounted, the collar being held on the shaft by a screw 24 and a retainer 25. The axis of the hole 21 is spaced radially from the rotational axis of the bar 11 and thus the shaft 20 is located eccentrically with respect to the bar. By turning the shaft within the bar and through one-half revolution about its own axis, the tooth may be moved outwardly from its inactive position to its cutting position as shown in full and phantom, respectively, in FIG. 2. Turning of the shaft may be effected by selectively operating a drive mechanism 26 (FIG. 1) extending through the machine spindle 14 and coupled to an actuating head 27 which, in turn, is operably connected to the shaft. After the tooth has been moved to its cutting position, the bar may be simultaneously rotated and pulled out of the bore to cause the tooth to enlarge and finish the bore.

In accordance with the present invention, the outer end portion of the shaft 20 is adapted to be coupled rigidly to the outer end portion of the bar 11 so that the rotational drive to the cutting tooth 15 during boring may be maintained primarily through the comparatively large diameter and torsionally stiff bar rather than through the slender and torsionally deflectable adjusting shaft. The shaft may, however, be selectively uncoupled from the bar to enable rotation of the shaft within the bar for the purpose of moving the cutting tooth between its active and inactive positions.

More specifically, coupling and uncoupling of the shaft 20 and the bar 11 is effected by sliding the shaft axially within the hole 21 between first and second positions to engage and disengage inner and outer serrated elements in the form of clutch rings 29 and 30 (FIGS. 1 and 4) which are carried by the bar 11 and the shaft 20, respectively. The ring 29 is located within the bar near the bottom of a counterbore 31 (FIG. 4) which is formed in the outer end of the bar in coaxial relation with the hole 21. Two diametrically opposite and radially extending slots 33 of rectangular cross-section are formed in the bottom of the counterbore and tightly receive correspondingly shaped lugs 34 which are formed integrally with and project axially from the inner face of the ring 29. By virtue of the lugs 34 fitting within the slots 33, the ring 29 is keyed rigidly to the bar 11 so as to rotate in unison with the bar. A set screw 35 (FIG. 1) extends through the bar and projects into a hole in the ring 29 to hold the ring in a fixed axial position with respect to the bar.

The shaft 20 extends slidably through the central opening in the inner ring 29 and supports the outer ring 30 in face-to-face relation with the inner ring. In this instance, an enlarged flange 36 (FIG. 4) is formed integrally with the portion of the shaft that is located in the counterbore 31, the inner face of the flange being formed with two slots 37 which are spaced ninety degrees from the slots 33. Lugs 39 project outwardly from the outer face of the outer ring 30 and fit tightly into the slots 37 to key the outer ring for rotation with the shaft 20. The outer ring 30 is tightly pressed onto the shaft to prevent the ring from moving axially along the shaft.

Mating serrations 40 are formed on the outer face of the inner ring 29 and on the inner face of the outer ring 30 and are adapted to mesh with one another to couple the rings for rotation as a unit. The serrations are formed by grooving the faces of the rings and extend radially across the faces so as to be capable of mating regardless of the angular position of the shaft 20 within the bar 31.

The shaft 20 is urged to slide inwardly to its first position within the bar 11 so that the serrations 40 on the opposing faces of the two rings 29 and 30 are normally drawn into meshing engagement. For this purpose, several Belleville springs 41 (FIG. 1) are stacked within a counterbore 43 in the inner end portion of the bar 11 and are loaded between the bottom of the counterbore and a flange 44 on the inner end portion of the shaft 20. The springs thus urge the shaft inwardly to keep the ring 30 coupled with the ring 29. By pushing the shaft outwardly with a rod 45 extending through the spindle 14, the ring 30 may be moved outwardly to uncouple its serrations from the serrations on the ring 29 and thereby enable the shaft to turn within the bar.

In operation, the cutting tooth 15 is retracted to its inactive position and the two rings 29 and 30 are coupled together when the bar 11 is thrust forwardly through the bore. After the cutting tooth has been shifted through the bore, the shaft 20 first is pushed outwardly by the rod 45 to uncouple the rings and then is turned by the mechanism 26 to shift the tooth into its cutting position. Thereafter, the outward pressure on the shaft is released to enable the springs 41 to shift the shaft inwardly and re-couple the ring 30 to the ring 29. When the bar is subsequently rotated and backed reversely through the bore by the spindle 14, the rotative drive is transmitted from the bar to the shaft and the cutting tooth by way of the rings 29 and 30 located near the extreme outer end of the bar. Accordingly, the driving torque is transmitted throughout virtually the entire length of the torsionally stiff main bar 11 and is applied to the comparatively slender shaft 20 only near the free end thereof. Torsional deflection of the shaft thus is small and hence a torsionally rigid drive to the tooth is maintained even though the tooth is carried directly on the small diameter adjusting shaft.

According to another aspect of the invention, angularly spaced supporting pads 50 are located adjacent the periphery of the bar 11 and are moved to outwardly projected positions as shown in phantom in FIG. 3 when the shaft 20 is turned to adjust the cutting tooth 15 to its active position. When in their outwardly projected positions, the pads 50 engage the wall of the bore and support the outer end portion of the bar within the bore so as to help keep the bar in a stable radial position in the bore.

In this instance, two supporting pads 50 are provided and each is carried on the outer end portion of a mounting lever 51 (FIG. 1) which is fitted within an axially extending slot 53 formed in the periphery of the bar 11. The pads are staggered axially with respect to one another along the bar (see FIG. 4) and are located generally on the side of the bar opposite to that from which the cutting tooth 15 projects when the tooth is in its active position.

Each mounting lever 51 is pivoted between its ends within its respective slot 53 as indicated at 54 (FIG. 1) so that the associated support pad 50 may swing substantially radially from its outwardly projected position to an inwardly retracted position as shown in full in FIG. 3. The pad is urged toward the latter position by coil springs 55 (FIG. 1) which are compressed between the bottom of the slot 53 and the inner end portion of the lever 51. When in their inwardly retracted positions, the pads may pass freely into the bore without engaging the wall thereof and thus do not interfere with forward movement of the bar into the bore.

Means are provided for adjusting the pads 50 outwardly into contact with the wall of the bore when the shaft 20 is turned to move the cutting tooth 15 to its active position. Herein, these means comprise pins 56 (FIGS. 1 and 3) which project through radially extending holes formed in the bar 11, there being one pin associated with each lever 51. The outer end of each pin 56 bears against the underside of the outer end portion of the associated lever 51 while the inner end of the pin is engageable with the shaft 20. The latter is formed with two axially and angularly spaced flats 57 which are alined axially with the pins 56. When the shaft is positioned so as to locate the cutting tooth 15 in its inactive position, the pins engage the flats and thus the pads 50 are forced inwardly to their inwardly retracted positions by the springs 55. As the shaft is turned to move the tooth to its cutting position, the flats are turned away from the pins, and the adjacent round portions of the shaft engage the pins to cam the pins outwardly and thus force the pads 50 outwardly into contact with the wall of the bore. Accordingly, the pads help hold the bar against radial movement when the bar is rotated and backed reversely out of the bore.

I claim as my invention:
1. Cutting apparatus comprising a rotatable bar having an outer end, a shaft telescoped axially within said bar and supported to turn within the bar about a rotational axis which is offset radially from the axis of the bar, selectively operable drive mechanism for rotating said shaft about its rotational axis, a cutting tooth secured to said shaft and located outwardly beyond the outer end of the bar, the radial spacing of said tooth relative to the axis of the bar being changed when said shaft is turned within said bar, means for sliding said shaft axially and outwardly within said bar from a first position to a second position without rotating said shaft during such sliding, means for biasing said shaft from said second position to said first position, an inner ring anchored rigidly within the outer end portion of said bar and slidably receiving said shaft, said ring having angularly spaced and radially extending serrations formed in its outer axially facing face, an outer ring anchored rigidly to the outer end portion of said shaft and located axially outwardly of said inner ring, said outer ring having angularly spaced and radially extending serrations formed in its inner axially facing face, the serrations on the two rings mating with one another to couple said bar and said shaft for rotation in unison when the shaft is in said first position and releasing one another to uncouple said bar and said shaft and permit turning of said shaft within said bar when said shaft is in said second position.

2. Cutting apparatus comprising a rotatable bar having an outer end, a shaft telescoped axially within said bar and supported to turn about a rotational axis which is offset radially from the axis of the bar, selectively operable drive mechanism for rotating said shaft about its rotational axis, a cutting tooth fixed rigidly to said shaft and located outwardly beyond the outer end of said bar, said tooth being moved from an inactive position located radially inwardly of the periphery of the bar to an active cutting position located radially outwardly of the periphery of the bar when said shaft is turned in one direction within said bar, said shaft being slidable axially within said bar between first and second positions, connecting means adjacent the outer end portions of said bar and said shaft and engageable to couple said bar and said shaft for rotation in unison when the shaft is in said first position and releasable to uncouple said bar and said shaft and permit said shaft to turn within said bar when the shaft is in said second position, angularly spaced support pads mounted on the periphery of said bar to move substantially radially between inwardly retracted and outwardly projected positions, means for urging each pad to its inwardly retracted position, and means engageable with said shaft and operable to move each pad to its outwardly projected position when said shaft is in said second position and is turned to move said cutting tooth from its inactive position toward its cutting position.

* * * * *